United States Patent [19]

Peters

[11] Patent Number: 5,717,379

[45] Date of Patent: Feb. 10, 1998

[54] REMOTE MONITORING SYSTEM

[75] Inventor: Wolfgang Peters, Tamm, Germany

[73] Assignee: Alcatel N.V., Rijswijk, Netherlands

[21] Appl. No.: 627,105

[22] Filed: Apr. 3, 1996

[30] Foreign Application Priority Data

Apr. 10, 1995 [DE] Germany ............... 195 12 959.8

[51] Int. Cl.$^6$ .................. G08B 1/08; H04N 7/18
[52] U.S. Cl. .............. 340/539; 340/531; 348/143; 348/152; 379/38
[58] Field of Search ................. 340/539, 531; 348/143, 152, 153; 379/59, 45, 37, 38, 39, 49

[56] References Cited

U.S. PATENT DOCUMENTS

| 3,816,662 | 6/1974 | Shaver et al. |
| 3,914,692 | 10/1975 | Seaborn, Jr. ............... 340/539 |
| 4,825,457 | 4/1989 | Lebowitz . |
| 4,843,377 | 6/1989 | Fuller et al. ............... 340/573 |
| 5,023,901 | 6/1991 | Sloan et al. ............... 379/38 |
| 5,027,383 | 6/1991 | Sheffer . |
| 5,270,811 | 12/1993 | Ishibashi et al. |
| 5,381,412 | 1/1995 | Otani ............... 348/14 |
| 5,581,297 | 12/1996 | Koz et al. ............... 348/152 |

FOREIGN PATENT DOCUMENTS

| 0 429 364 | 5/1991 | European Pat. Off. . |
| 0 632 635 | 1/1995 | European Pat. Off. . |
| 38 27 928 | 2/1990 | Germany . |
| 42 03 388 | 8/1993 | Germany . |
| 42 25 741 | 9/1993 | Germany . |
| 42 29 151 | 3/1994 | Germany . |
| 43 17 388 | 12/1994 | Germany . |
| 2-221140 | 4/1992 | Japan . |
| WO 94/03014 | 2/1994 | WIPO . |

OTHER PUBLICATIONS

Alcatel, Sel "Der Telenachbar", Wolfgang P. Peters, Stuttgart, Germany Apr. 3, 1996.

Primary Examiner—Donnie L. Crosland
Attorney, Agent, or Firm—Frishauf, Holtz, Goodman, Langer & Chick

[57] ABSTRACT

A remote monitoring system for monitoring properties of persons to be protected includes at least one video pickup device (C) positioned at the property (1) to be protected. The video pickup device can either be continuously operable or activated via a datalink by a central station. The person to be protected who is approaching the property (1) is informed about conditions at the property via a mobile telephone (MT) before arriving at the property being protected based on surveillance data provided to the central station by the video pickup device.

12 Claims, 2 Drawing Sheets

REMOTE MONITORING SYSTEM

FIELD OF THE INVENTION

This invention relates to a remote monitoring system for monitoring at least one property of at least one person to be protected.

DESCRIPTION OF THE PRIOR ART

In the prior art, systems are already known which monitor properties, such as apartment buildings, so that they can be protected in a simple and effective way. One known example is the so-called "Teleneighbor" system. Using a commercially available sensor, for instance, an undesired event such as a break-in or fire within a house or apartment is recorded and as a result, a target key of a telephone is activated, which then dials a previously arranged number, such as the number of an authorized neighbor. The neighbor finds that an automatic call was initiated from the property being monitored and has the capability of switching on a special telephone microphone that picks up sound inside the property being monitored. Naturally, in the "Teleneighbor" system, the "authorized neighbor" may himself be the owner of the property being monitored, who has had a call forwarded to, for example, his office telephone number.

It has also been noted in the prior art that to preclude false alarms it is desirable to more than merely listen in on the property; it would also be desirable to be able to "look in" on the property, too. This could be done by means of an ISDN video telephone, which is equipped with a surveillance camera with an integrated motion sensor. If the undesired event occurs, the motion sensor initiates the establishment of a video telephone connection with the authorized neighbor who can call the police as needed.

However, according to the above-described system, the authorized neighbor is called only if the undesired event occurs. Permanent monitoring of the property or of a person to be protected is not possible with this prior art system.

The systems described above may, for example, find broad application in in-home security systems that allow a user to perform active testing. In this case, the user initiates a call by video telephone into his own home for testing, to see whether everything is as it should be. This can be done if someone is on vacation, for example, or if one is keeping large amounts of money or valuables in his home as described in "Der TeleNachbar" [The Teleneighbor], advertising brochure published by Alcatel SEL, Stuttgart, Germany.

From German Patent Disclosure DE-OS 38 27 928, a video telephone with a monitoring circuit is known. In this monitoring circuit, video images are stored in an image memory and are compared with a previously stored image. If the images differ, an alarm can be sent to a monitoring point by means of an automatic dialer or a wireless link. This system is used for in-house monitoring.

SUMMARY OF THE INVENTION

It is accordingly an object of the invention to provide an apparatus that is used for remote monitoring of a property to be monitored, and/or of a person to be protected.

It is another object of the invention to provide a method for monitoring a property and/or a person to be protected that allows the person to learn directly what condition the property is in.

These objects are obtained according to the invention by a remote monitoring system for monitoring at least one remote property, wherein the at least one property (1) to be monitored is equipped with at least one video pick-up device (C); the property (1) to be monitored is connected to a telecommunications network (ISDN) and is connected by the telecommunications network to a central station (2) which is equipped with both a video telephone (BT) for monitoring the property (1) and with a mobile telephone (MT) for exchanging information with a person.

In addition these objects are obtained by a method for monitoring a property of a person to be protected, having a monitoring system as described above in which a central station (2) monitors the property (1) to be monitored by video, and in which the person to be protected, before arriving at the property (1) reports his impending arrival at the property by use of a mobile telephone (MT) to the central station (2) and from the central station a video interrogation of the property to be monitored is made by remote control for control purposes, and after this video interrogation is evaluated, information about the condition of the property is provided to the person to be protected before the person to be protected arrives at the property.

It proves to be advantageous that the property to be monitored can either be subject to permanent monitoring or be monitored only if a person to be protected is approaching the property, or in other words if the person wants monitoring to be done. The person to be protected can make a security check of the property shortly before arriving at or in the property, for instance by calling a central station by mobile telephone. This affords the person to be protected a convenient, safe and an inexpensive way of achieving protection without unduly endangering himself.

Another advantage of the invention is that a person to be protected, for instance an important person in a corporation, can have his own private property monitored for personal protection purposes by the corporation's own security service. As a result, the high cost of a personal bodyguard need not be incurred, or at least can be reduced. Moreover, such protection can be provided via a direct connection to a police station or to a private security guard service. Such systems can enable every person to have a relatively favorable opportunity for personal protection. This type of protection can also be employed for large apartment-house complexes, where security problems repeatedly arise because of the anonymity that prevails there.

Another advantageous feature of the remote monitoring system and method of the invention is that it can provide an acoustical and/or visual alarm for the property to be monitored that has been subjected to an undesired event.

The monitoring system can also trigger an alarm at the central station which monitors the property when an undesired event occurs.

The monitoring system can also include at least one video telephone (VT) for transmitting video data picked up by a video pick-up device (C).

The monitoring system can be equipped with a door intercom system (TS) which has an integrated camera (K) which can be connected to the central station by telecommunications link (ISDN). The remote monitoring system of the invention can also permit the owner of the property to identify himself as an authorized person via the door intercom system.

The monitoring system can also include a video telephone (RT) for displaying video images of the property and a mobile telephone (MT) for providing information about the condition of the property or of the person to be protected.

The method of the invention permits the owner of the property to feel safe when arriving at the property by monitoring the property with a video camera before the owner arrives at the property and permits the owner to be protected while on the property by monitoring controlled from the central station (2).

DETAILED DESCRIPTION

The invention will be described in further detail below in conjunction with FIG. 1.

Figure 1:
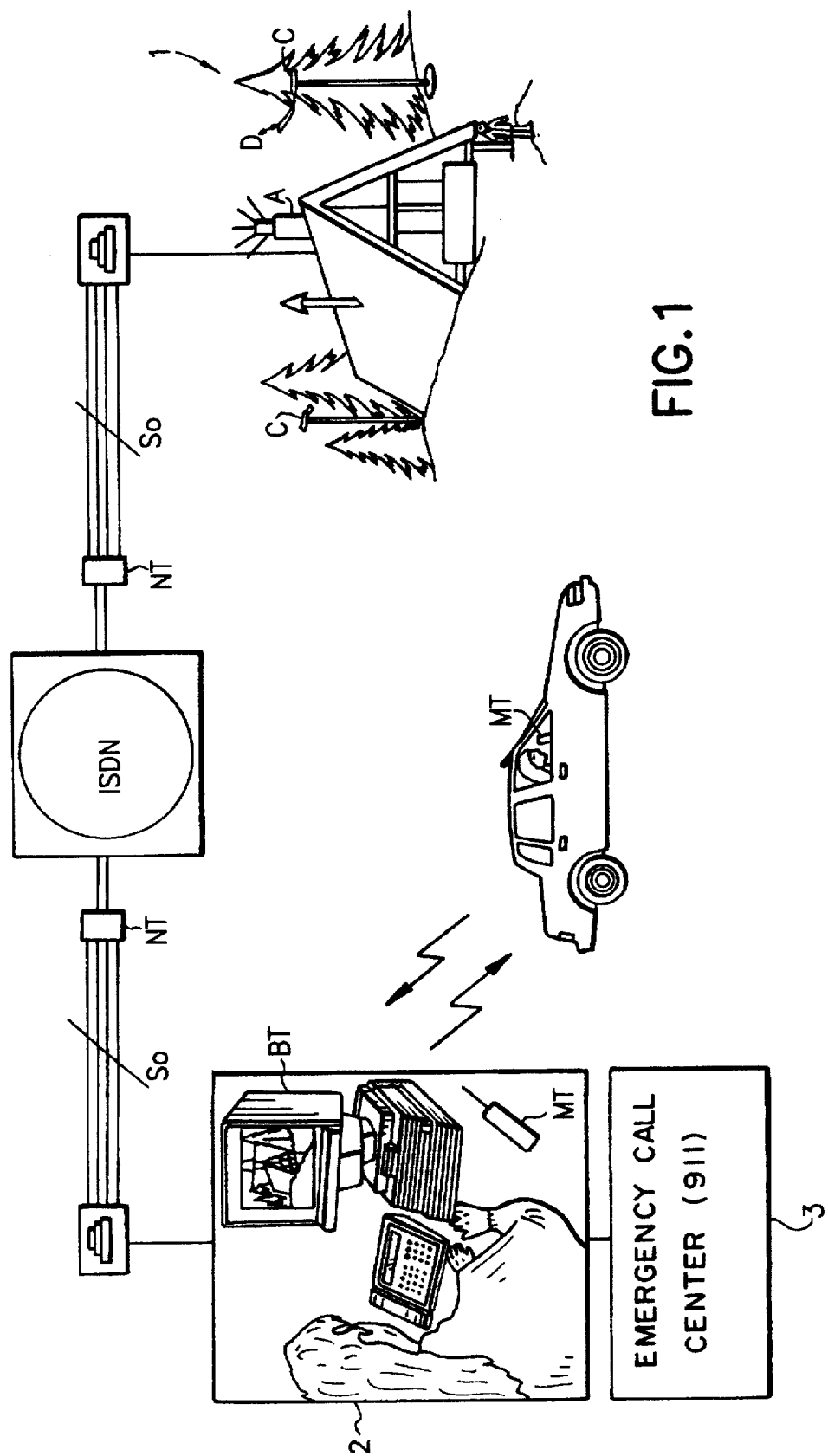
FIG. 1 is an illustration of a remote monitoring system of the invention.

A remote monitoring system for at least one property 1 to be monitored, for example belonging to a person to be protected, is equipped with at least one video pickup device C (FIG. 1 shows two video pickup devices C) which provides surveillance data. The property 1 to be protected, in this case can be a privately owned lot with a house on it. The monitoring system is also connected to a data link such as a telecommunications network ISDN. The telecommunications network is advantageously a digital ISDN network. A connection to the ISDN network can be made by way of the well-known $S_0$ interface and a corresponding network terminal NT.

The property 1 to be monitored is connected to a central station 2 via the telecommunications network ISDN. The central station 2 is equipped with a video telephone BT for monitoring the property. The video telephone BT may for instance be a commercially available video telephone, such as the Alcatel Model 2838. The central station 2 also has a connection for a mobile telephone MT, so that information can be exchanged with a person to be protected. Over the video telephone BT, a connection can be made with the property 1 to be monitored. The video data picked up there by the video pickup devices C, which, for example, are commercially available outdoor video cameras, is transmitted over the telecommunications network ISDN or by a wireless data link D to the central station 2, where the image is reproduced on the video telephone BT and can be monitored. Monitoring can then be performed by a human being, for instance, or can be automated, as has been explained above in connection with the prior art for an in-home system.

An alarm system A on the premises of the property 1 to be monitored can be tripped (turned on) from the central station 2 or from inside the house on the property. This alarm system A may be an acoustical and/or visual alarm system.

In another case, an alarm can be tripped directly in an emergency call center 3 from the central station 2. The emergency call center, for instance may be a police station emergency call center or a 911 number. The police or 911 can then be responsible for further actions, such as dispatching policemen or firemen.

The above-described remote monitoring system of FIG. 1 offers two possibilities. The first possibility is that a permanent video monitoring of the property to be monitored can be provided. The second possibility is that an image connection with the property 1 to be monitored is made in response to an undesired event and a special interrogation of the property is then made; monitoring of the property to be monitored is thus performed in response to a special instruction or request. This can be done for instance if a person to be protected is approaching the property and wants to be sure that no unauthorized person is in the vicinity.

One exemplary embodiment of equipping a property 1 to be monitored will be described below in conjunction with FIG. 2.

Figure 2:
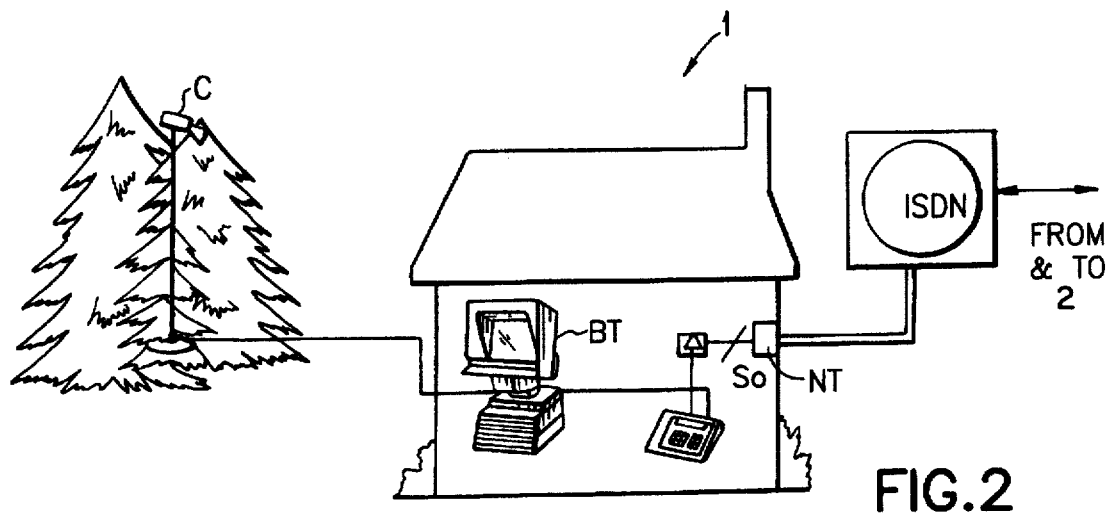
FIG. 2 is a first exemplary embodiment for equipping the property to be protected.

In FIG. 2, the property 1 to be monitored is connected to a telecommunications network ISDN. This can be done for instance via a network terminal NT and an $S_0$ interface $S_0$. The property 1 to be monitored is equipped with a video telephone BT and at least one video pickup device C, such as an outdoor camera. The video pickup device C is used for outdoor monitoring of the property to be monitored and takes pictures of it from outside. The pictures are sent via the video telephone BT and the connection to the telecommunications network ISDN and are passed on to a central station 2. Alternatively, video data from pickup device C can be sent to the central station 2 by a wireless (radiowave, microwave, etc.) link.

In the case under discussion here, where a video telephone BT is also provided inside the property 1 to be monitored, additional protection can be gained by also providing a system of the kind described in the "Teleneighbor" brochure of the prior art. A sensor is arranged such that on the occurrence of a special event, such as motion inside a room, a connection with a central station is automatically made.

A second exemplary embodiment of equipping a property 1 to be monitored will now be described in detail in conjunction with FIG. 3.

Figure 3:
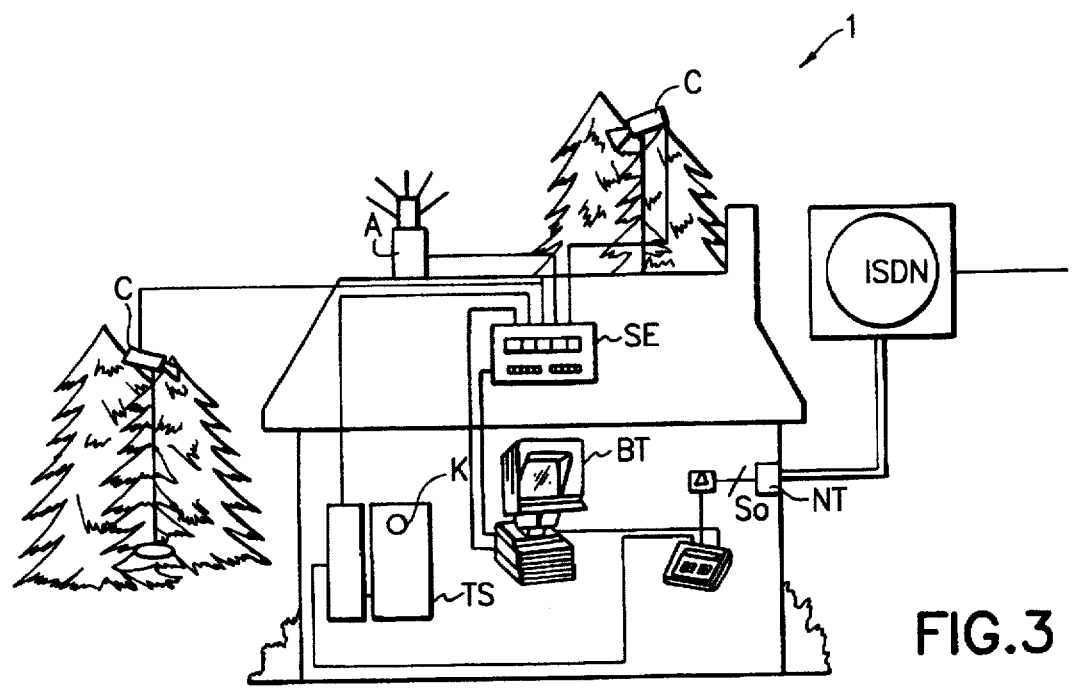
FIG. 3 is a second exemplary embodiment for equipping the property to be protected.

In FIG. 3 the property 1 to be monitored is again connected to a central station 2 via a telecommunications network ISDN. The connection of the property to the telecommunications network, in this case the ISDN network, again takes place via the usual means described above.

The property 1 to be monitored is equipped with video pickup devices C. In the example of FIG. 3, two video cameras are shown. An alarm system A is also located on the property to be monitored. The alarm system A may issue a visual and/or an acoustical alarm. Inside the property 1 to be monitored there is also a video telephone BT. The property 1 to be monitored is also equipped with a door intercom system TS, which can be connected to the central station 2 via the telecommunications network ISDN or via a wireless link. The door intercom system TS, which is located at the entry door, for instance, is equipped with an integrated camera K. For instance, if someone approaches the entry door and rings the bell, and the owner of the property is not at home or does not want to open the door, then a connection with the central station can be made by the owner or upon the pressing of the door bell. By means of the integrated camera K, it can be learned who is at the door, and a picture of the person can be taken and stored in memory. Via an additional connection by speech transmission to the central station which may also be a wireless link, a person can state his business and optionally show identification to prove he is an authorized person. This feature has the additional effect that a person located at the door cannot find out whether anyone is at home. Instead, the impression is always given that the property has not been left unoccupied.

Another feature of this door intercom system TS, however, is that in the event that the owner is not at home or does not want to open the door, the integrated camera K of the door intercom system TS is activated, and a picture of the person at the door is recorded and stored in memory. The person can thus leave a video message, for instance, to tell the property owner why he was at the door and what his business was.

Both the video telephone BT and the door intercom system TS, as well as the alarm system A and the video pickup devices C, are all connectable to a control unit SE. The control unit SE is controllable via the digital telephone network ISDN, so that an alarm system A, or the video telephone BT, or the door intercom system TS, or the outdoor cameras C can each, or all, be controlled from the central station 2.

A method for monitoring property of a person to be protected will now be described in further detail, in terms of one exemplary embodiment. In this case, if a person to be protected approaches a property 1 to be monitored, a connection with a central station 2 can be made by the person to be protected, for instance via a mobile telephone MT, in order to ask what condition the property 1 to be monitored is in. The central station 2 thus asked makes a video or picture connection with the property 1 to be monitored, over a telecommunications network ISDN. For instance, the property 1 to be monitored is monitored by video. To check the condition of the property to be monitored, a video interrogation of the video pickup devices C located on the property to be monitored is started. Then the video interrogation is evaluated, and information on the condition of the property is provided to the person to be protected.

In the event that the central station 2 has provided the person to be protected with information that an unauthorized person is, or has been, in the vicinity of the house, then the person to be protected can decide whether or not to approach the property.

If the information provided by the central station 2 is that the property being monitored is in acceptable condition, then the person can now calmly approach the property.

A further feature that can be provided by the invention is that the person to be protected can continue to be monitored by video, until he or she is inside the house and no longer wishes further video monitoring to be done. This assures that a person to be protected is protected until he or she is inside the property being monitored.

To assure that only authorized persons can learn the current condition of a property to be monitored, interrogation by password may be provided, for instance. Any other known access control for authorized persons may also be provided, such as speech recognition.

By also equipping the interior of the property 1 to be monitored with a video telephone BT, one can assure that if an unauthorized person has nevertheless been able to gain access to the property 1 being monitored, additional monitoring will take place inside. This increases security still further.

Such monitoring can also be employed when large properties are to be monitored, and where there are many persons to be protected, such as in an apartment-house complex. Here all the inhabitants count as a person to be protected and can be accompanied by video monitoring as far as their apartment door. Particularly in view of the great anonymity that prevails in large apartment complexes, with the attendant constantly increasing threat to life and limb, such a service can gain broad application in the future.

Various changes and modifications may be made, and any features described herein in connection with any one embodiment may be used with any of the others, within the scope of the inventive concept.

I claim:

1. A monitoring method comprising the steps of:
   transmitting an activation signal from an information station situated at a first location via a first network to a monitoring station,
   transmitting, in response to said activation signal, a further activation signal from said monitoring station to an object situated at a second location via a second network,
   transmitting, in response to said further activation signal, a video signal from said object at said second location back to said monitoring station via said second network, and then
   transmitting, in response to said video signal, an information signal from said monitoring station to said information station situated at said first location via said first network, and wherein said first location and said second location are mutually different.

2. A monitoring method according to claim 1, further comprising:
   providing at said monitoring station, a first videophone for transmitting said further activation signal and for receiving said video signal via said second network, and
   providing at said object situated at said second location, a second videophone for receiving said further activation signal and for generating said video signal via said second network.

3. A monitoring method according to claim 2, wherein said second network comprises an ISDN network.

4. A monitoring method according to claim 1, further comprising:
   providing at said monitoring station a first mobile telephone for receiving said activation signal and for transmitting said information signal via said first network, and
   providing at said information station situated at said first location, a second mobile telephone for transmitting said activation signal and for receiving said information signal via said first network, and wherein said first network comprises a mobile radio network.

5. A monitoring method according to claim 1, further comprising:
   providing at said monitoring station a first videophone for receiving said further activation signal and for receiving said video signal via said second network, and
   providing at said object situated at said second location, a second videophone for receiving said further activation signal and for generating said video signal via said second network.

6. A monitoring method according to claim 5, wherein said second network comprises an ISDN network.

7. A monitoring station comprising:
   a first receiver for receiving an activation signal via a first network from an information station situated at a first location,
   a first transmitter coupled to said first receiver which, in response to said activation signal, transmits a further activation signal via a second network to an object situated at a second location,
   a second receiver for receiving a video signal via said second network from said object situated at said second location, said video signal being transmitted in response to said further activation signal, and
   a second transmitter, coupled to said second receiver, and which is responsive to said video signal, for transmitting an information signal via said first network to said information station situated at said first location, and wherein said first location and said second location are different from each other.

8. A monitoring station according to claim 7, further comprising:

a first videophone comprising said first transmitter and said second receiver, and a second videophone, provided at said object situated at said second location, for receiving said further activation signal and for generating said video signal via said second network.

9. A monitoring station according to claim 8, wherein said second network comprises an ISDN network.

10. A monitoring station according to claim 7, further comprising:

a first mobile telephone comprising said first receiver and said second transmitter, and a second mobile telephone, provided at said information station situated at said first location, for transmitting said information signal and for receiving said information signal via said first network, and wherein said first network comprises a mobile radio network.

11. A monitoring station according to claim 10, further comprising:

a first videophone comprising said first transmitter and said second receiver, and a second videophone provided at said object situated at said second location, for receiving said further activation signal and for generating said video signal via said second network.

12. A monitoring station according to claim 11, wherein said second network comprises an ISDN network.

* * * * *